(12) United States Patent
Rubinstein et al.

(10) Patent No.: US 11,646,990 B2
(45) Date of Patent: *May 9, 2023

(54) MANAGING EPHEMERAL POSTS IN A SOCIAL NETWORKING SYSTEM

(71) Applicant: Meta Platforms, Inc., Menlo Park, CA (US)

(72) Inventors: Yigal Dan Rubinstein, Los Altos, CA (US); Aditya Koolwal, San Francisco, CA (US); Ken Taro Deeter, Redwood City, CA (US); Sergey Markov, Scarsdale, NY (US); Karl Frankowski, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,678

(22) Filed: Jun. 13, 2022

(65) Prior Publication Data

US 2022/0311731 A1    Sep. 29, 2022

Related U.S. Application Data

(63) Continuation of application No. 17/170,620, filed on Feb. 8, 2021, now Pat. No. 11,405,348, which is a
(Continued)

(51) Int. Cl.
*H04L 51/52* (2022.01)
*H04L 65/403* (2022.01)
(Continued)

(52) U.S. Cl.
CPC .......... *H04L 51/52* (2022.05); *G06F 3/04842* (2013.01); *G06F 3/04847* (2013.01);
(Continued)

(58) Field of Classification Search
CPC . G06F 3/04842; G06F 3/04847; H04L 51/52; H04L 65/403; H04L 63/108; H04W 4/21; G06Q 50/01
See application file for complete search history.

(56) References Cited

U.S. PATENT DOCUMENTS 6,757,713 B1 * 6/2004 Ogilvie ............... G06Q 10/107
                                                         709/202
7,149,893 B1    12/2006 Leonard et al.
(Continued)

OTHER PUBLICATIONS

Billy G., "You Know What's Cool? A Billion Snapchats: App Sees Over 20 Million Photos Shared Per Day, Releases on Android," TechCruch [Online], Oct. 29, 2012 [Retrieved on Feb. 23, 2015], pp. 1-4, Retrieved from the Internet: http://techcrunch.com/2012/10/29/billion-snapchats/.
(Continued)

*Primary Examiner* — Dino Kujundzic
(74) *Attorney, Agent, or Firm* — Keller Preece PLLC

(57) ABSTRACT

A method of posting ephemeral posts is disclosed. The method starts with receiving, from a user of a social network, a request to post an ephemeral post, the request including an ephemeral variable associated with a threshold event. The ephemeral post is posted on behalf of the user. Then an occurrence of the threshold event is monitored. When the threshold event has not occurred, the post is allowed to be accessible to at least one viewer other than the user. When the threshold event has occurred, the post is blocked from being accessible by the at least one view other than the user.

20 Claims, 10 Drawing Sheets

John Doe
I'd love to have two dollar bills.
Like · Comment · 2 hours ago

Visual Timer Indication 802

Related U.S. Application Data continuation of application No. 16/530,648, filed on Aug. 2, 2019, now Pat. No. 10,917,377, which is a continuation of application No. 15/001,089, filed on Jan. 19, 2016, now Pat. No. 10,389,676, which is a continuation of application No. 13/841,590, filed on Mar. 15, 2013, now Pat. No. 9,264,463.

(51) Int. Cl.
| | |
|---|---|
| *G06Q 50/00* | (2012.01) |
| *H04L 9/40* | (2022.01) |
| *H04W 4/21* | (2018.01) |
| *G06F 3/04847* | (2022.01) |
| *G06F 3/04842* | (2022.01) |

(52) U.S. Cl.
CPC ........... *G06Q 50/01* (2013.01); *H04L 63/108* (2013.01); *H04L 65/403* (2013.01); *H04W 4/21* (2018.02)

(56) References Cited

U.S. PATENT DOCUMENTS

| | | | |
|---|---|---|---|
| 7,373,321 B2 * | 5/2008 | Collings | G06Q 40/00 705/35 |
| 7,519,670 B2 * | 4/2009 | Hagale | G06Q 10/107 709/206 |
| 7,908,219 B2 | 3/2011 | Abanami et al. | |
| 8,352,560 B2 | 1/2013 | O'Sullivan et al. | |
| 9,264,463 B2 | 2/2016 | Rubinstein et al. | |
| 9,628,449 B1 | 4/2017 | Statica | |
| 9,807,049 B2 | 10/2017 | Halliday et al. | |
| 10,116,615 B2 | 10/2018 | Rubinstein et al. | |
| 10,284,508 B1 | 5/2019 | Allen et al. | |
| 2001/0027439 A1 | 10/2001 | Holtzman et al. | |
| 2002/0099649 A1 | 7/2002 | Lee et al. | |
| 2003/0101454 A1 | 5/2003 | Ozer et al. | |
| 2004/0249900 A1 | 12/2004 | Karstens | |
| 2005/0198128 A1 | 9/2005 | Anderson et al. | |
| 2006/0136498 A1 | 6/2006 | Insley | |
| 2006/0270419 A1 | 11/2006 | Crowley et al. | |
| 2007/0073823 A1 | 3/2007 | Cohen et al. | |
| 2008/0005282 A1 | 1/2008 | Gaedcke | |
| 2008/0045236 A1 | 2/2008 | Nahon et al. | |
| 2008/0160956 A1 | 7/2008 | Jackson et al. | |
| 2009/0248751 A1 * | 10/2009 | Myman | H04L 51/04 |
| 2009/0292595 A1 | 11/2009 | Tonnison et al. | |
| 2010/0017492 A1 * | 1/2010 | Reistad | H04L 51/04 709/206 |
| 2010/0280909 A1 | 11/2010 | Zhang et al. | |
| 2011/0066743 A1 | 3/2011 | Hurley et al. | |
| 2012/0246578 A1 | 9/2012 | Baldwin et al. | |
| 2013/0091019 A1 | 4/2013 | Mallon et al. | |
| 2013/0115911 A1 | 5/2013 | Vishwanathan et al. | |
| 2013/0132908 A1 * | 5/2013 | Lee | G06F 3/04817 715/764 |
| 2013/0159463 A1 | 6/2013 | Bentley et al. | |
| 2013/0198652 A1 | 8/2013 | Dunn et al. | |
| 2014/0012806 A1 | 1/2014 | Ching et al. | |
| 2014/0032682 A1 | 1/2014 | Prado et al. | |
| 2014/0122584 A1 | 5/2014 | Gargi et al. | |
| 2015/0066863 A1 * | 3/2015 | Sehrer | G06Q 50/01 707/663 |
| 2015/0188873 A1 | 7/2015 | Halliday et al. | |
| 2015/0350351 A1 | 12/2015 | Tung | |
| 2016/0119272 A1 | 4/2016 | Rubinstein et al. | |
| 2016/0134582 A1 | 5/2016 | Rubinstein et al. | |
| 2016/0371471 A1 | 12/2016 | Patton et al. | |
| 2018/0176316 A1 | 6/2018 | Brooks et al. | |

OTHER PUBLICATIONS

Final Office Action dated Jul. 6, 2018 for U.S. Appl. No. 15/001,089, filed Jan. 19, 2016, 17 Pages.
Final Office Action dated Feb. 16, 2018 for U.S. Appl. No. 14/986,127, filed Dec. 31, 2015, 17 Pages.
Jean., "What is Snapchat? Is Snapchat Okay for Kids?," Be Web Smart [Online], Jan. 4, 2013 [Retrieved on Feb. 23, 2015], pp. 1-2, Retrieved from the Internet: http://www.bewebsmart.com/internetsafety/is-snapchat-okay-for-kids/.
Leyden J., "This SMS Will Self-Destruct in 40 Seconds," The Register [online], Dec. 12, 2005, 3 Pages, Retrieved from the Internet: URL: https://www.theregister.com/2005/12/12/stealthtext/.
Melanson M.,"This Text Message Will Self Destruct in 60 Seconds," Readwrite.com [Online], Jan. 18, 2013 [Retrieved on Feb. 11, 2011 ], 4 pages, Retrieved from the Internet: URL: https://readwrite.com/2011/02/11/this_text_message_will_self_destruct_in_60_seconds/.
Non Final Office Action dated Jun. 12, 2020 for U.S. Appl. No. 16/530,648, filed Aug. 2, 2019, 41 Pages.
Non-Final Office Action dated Nov. 2, 2018 for U.S. Appl. No. 15/001,089, filed Jan. 19, 2016, 7 Pages.
Non-Final Office Action dated Feb. 25, 2015 for U.S. Appl. No. 13/841,590, filed Mar. 15, 2013,11 Pages.
Non-Final Office Action dated Jul. 26, 2017 for U.S. Appl. No. 14/986,127, filed Dec. 31, 2015,11 Pages.
Non-Final Office Action dated Jul. 29, 2014 for U.S. Appl. No. 13/915,592, filed Jun. 11, 2013, 13 Pages.
Notice of Allowance dated Apr. 5, 2019 for U.S. Appl. No. 15/001,089, filed Jan. 19, 2016, 08 Pages.
Notice of Allowance dated Oct. 5, 2020 for U.S. Appl. No. 16/530,648, filed Aug. 2, 2019, 32 Pages.
Notice of Allowance dated Nov. 6, 2015 for U.S. Appl. No. 13/841,590, filed Mar. 15, 2013, 15 Pages.
Notice of Allowance dated Jun. 20, 2018 for U.S. Appl. No. 14/986,127, filed Dec. 31, 2015, 09 Pages.
Office Action dated Nov. 16, 2017 for U.S. Appl. No. 15/001,089, filed Jan. 19, 2016, 10 Pages.
Robert M., "This Text Will Self-Destruct—Snapchat Sweeps campus," Oct. 14, 2012 [Retrieved on Feb. 23, 2015], 02 page , Retrieved from the Internet: http://nymag.com/news/intelligencer/snapchat-2012-10/.

* cited by examiner

MANAGING EPHEMERAL POSTS IN A SOCIAL NETWORKING SYSTEM

CROSS-REFERENCE TO RELATED APPLICATIONS

This application is a continuation of U.S. application Ser. No. 17/170,620, filed Feb. 8, 2021, which is a continuation of U.S. application Ser. No. 16/530,648, filed Aug. 2, 2019, which issued as U.S. Pat. No. 10,917,377, which is a continuation of U.S. application Ser. No. 15/001,089, filed Jan. 19, 2016, which issued as U.S. Pat. No. 10,389,676, which is a continuation of U.S. application Ser. No. 13/841,590, filed Mar. 15, 2013, which issued as U.S. Pat. No. 9,264,463. Each of the aforementioned applications are hereby incorporated by reference in their entirety.

FIELD

The embodiments of the invention are related to the field of Internet messaging. More specifically, the embodiments are related to creating and managing ephemeral posts in a social networking system.

BACKGROUND

Today the Internet permeates everyday life. While passively viewing online content is still a mainstay of the Internet experience, more and more Internet users are creating contents on the Internet, through webpages and online social networking sites. User generated content has seen exponential growth in recent years, and posting, viewing, and replying to messages on a social network site are growing to become a daily routine of a significant percentage of Internet users. An August 2011 survey by the Pew Internet & American Life Project found that 65% of American online adults use social networking sites, up dramatically from 8% found by the same organization in a February 2005 survey.

Messaging through a social network site allows people to brainstorm ideas, share interests, exchange experiences, and generally "stay in touch" with family, friends, associates, and the world-at-large. Yet, many people remain reluctant to post messages on a social network site. One impediment to more message posting is the inkling that messages posted online are "always out there." Some people are afraid that a spontaneous message posted on a social network site remains indefinitely beyond the poster's control.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
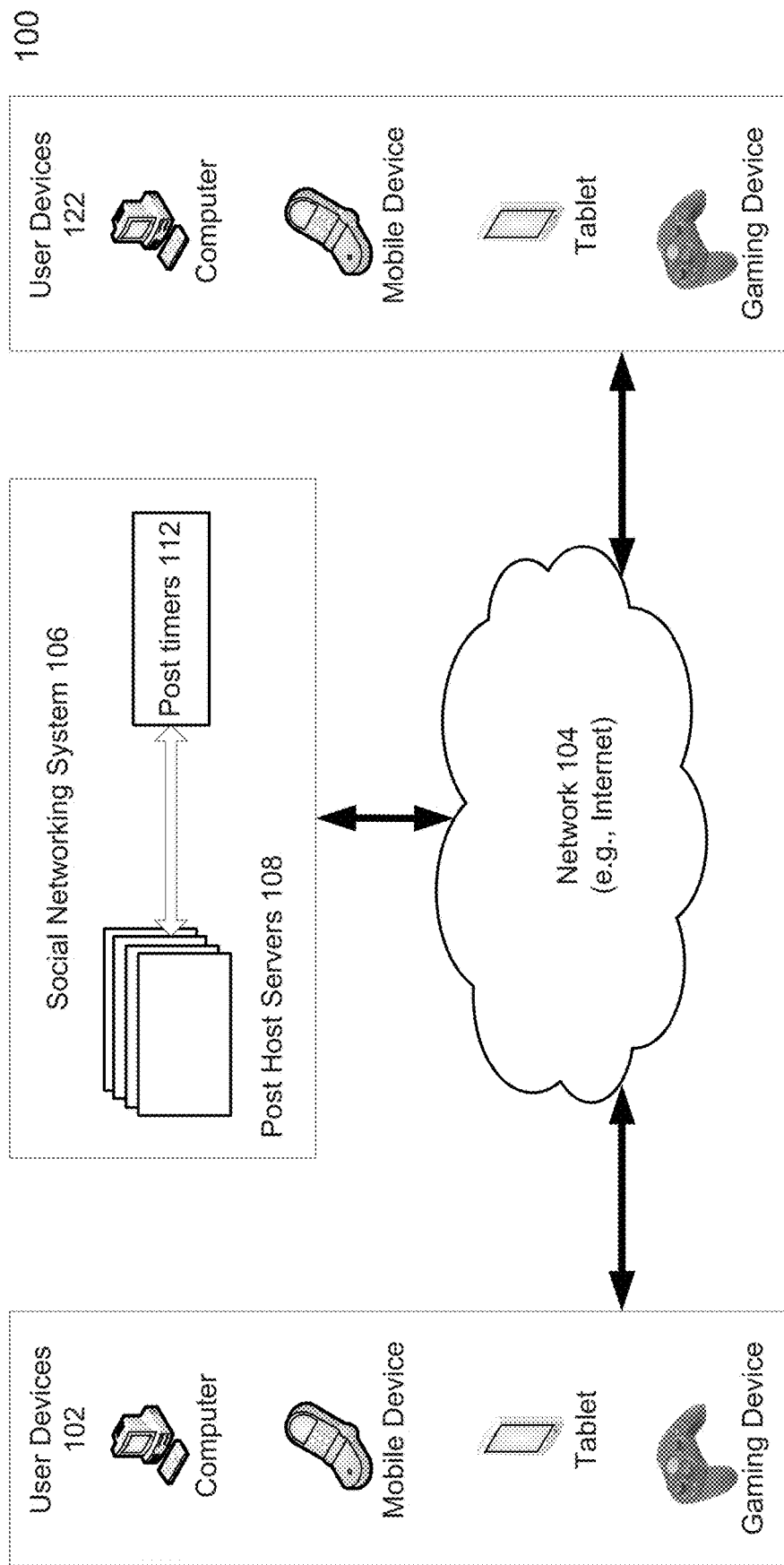
FIG. 1 is a block diagram illustrating a social networking system according to one embodiment of the invention.

FIG. 1 is a block diagram illustrating a social networking system according to one embodiment of the invention. Referring to FIG. 1, user devices 102 and 122 communicate with social network system 106 through network 104. Network 104 may be any type of network such as a local area network (LAN), a wide area network (WAN) such as Internet, a corporate intranet, a metropolitan area network (MAN), a storage area network (SAN), a bus, or a combination thereof, wired and/or wireless. User devices 102 and 122 may be any device communicatively coupled to network 104, such as computers, mobile devices (cellphones, wearable Internet devices, automobile based Internet devices, etc.), smart TVs/setup boxes, Internet gaming devices, a personal digital assistant (PDA), a Web enabled system, a media player, a "thin" client, etc.

Social networking system 106 operates a social network site, platform, or an online service that facilitates the building of social networks or social relations among people and other entities such as corporations. Social networking system 106 allows users to designate other users or entities as connections, or otherwise connect to, or form relationships with, other users or entities. Additionally, users contribute and interact with their connections, use applications, join groups, list and confirm attendance at events, invite connections, or perform other tasks that facilitate social interaction. External applications also use the services of the social networking system to allow authenticated users to incorporate some of the above social interactions with use of the external applications.

For managing message posting (referred to as posts), social networking system 106 may contain post host servers 108. Post host servers 108 may include a variety of storage devices, including a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Among the posts stored in post host servers 108, a number of posts are categorized as ephemeral posts which are discussed in greater detail below. Note posts can be messages, photos, videos, tag, location information, sentiment, text, hyperlinks to locations on the Internet, and/or other structured data. While message is a dominate post type in current social networking system/site, the principle disclosed herein applies to any post type.

Generally, a creator of a typical post in a social networking system has no control over the duration of the post's life on the system. The social networking system may display a posted post indefinitely, which may be long past a useful/desirable period for the creator. Ephemeral posts are different and they may be associated with an ephemeral variable. When the ephemeral variable reaches a certain threshold, an ephemeral post becomes no longer viewable by other users of the social networking system. In other words, ephemeral posts are "perishable." In some embodiments, a user/creator of an ephemeral post specifies the condition(s) of the ephemeral post being blocked from being viewed, forwarded, searched, replied or otherwise accessed. In social networking system 106, post timers 112 may track these specified conditions associated with ephemeral posts stored in post host servers 108.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example, and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similar to events, the calendar entries may include times, dates, locations and identities of other users.

Figure 2:
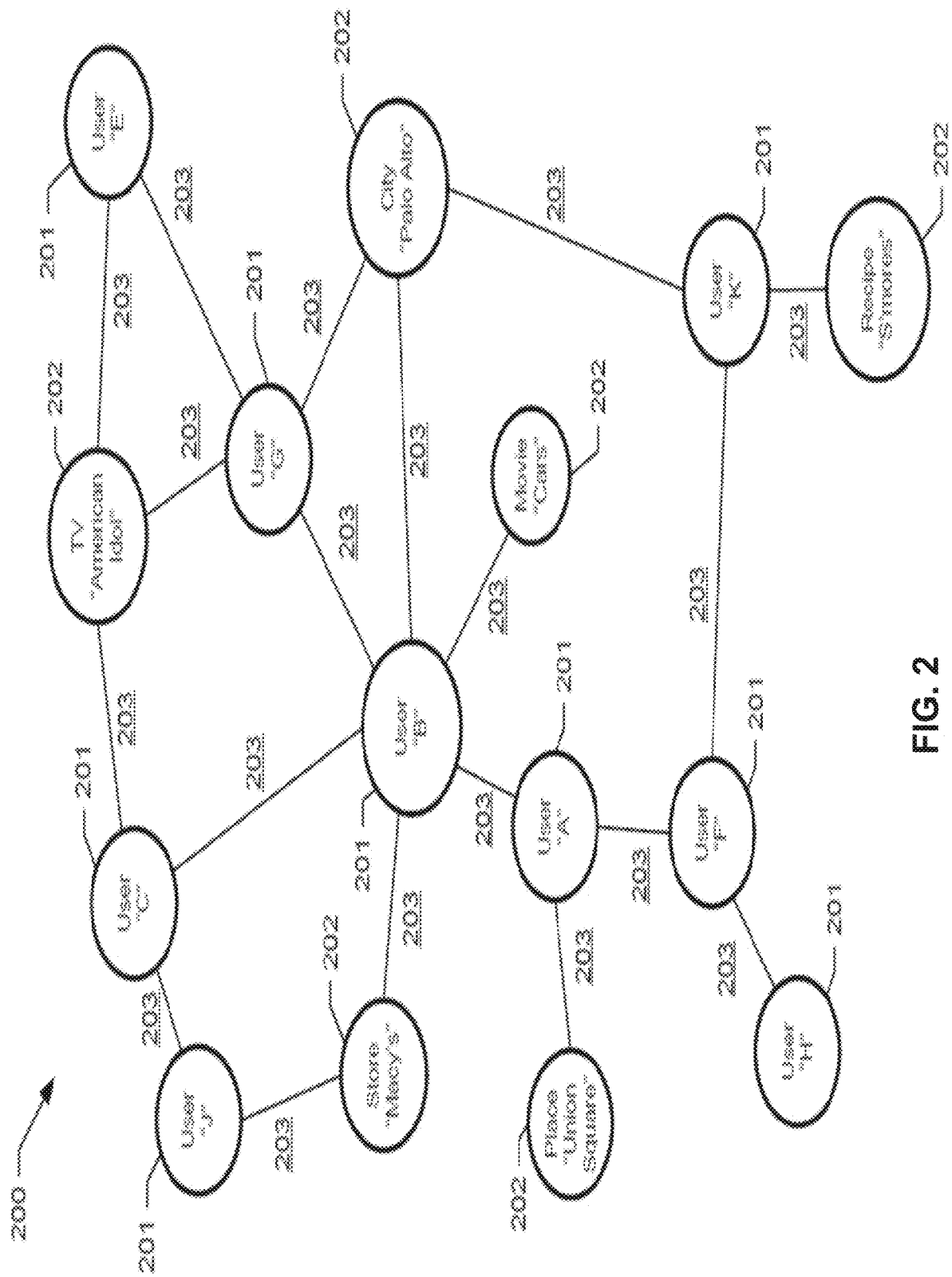
FIG. 2 illustrates an example social graph 200 that may be used by a social networking system.

FIG. 2 illustrates an example social graph 200 that may be used by a social networking system. In the example of FIG. 2, social graph 200 includes user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 200 illustrated in FIG. 2, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Figure 3:
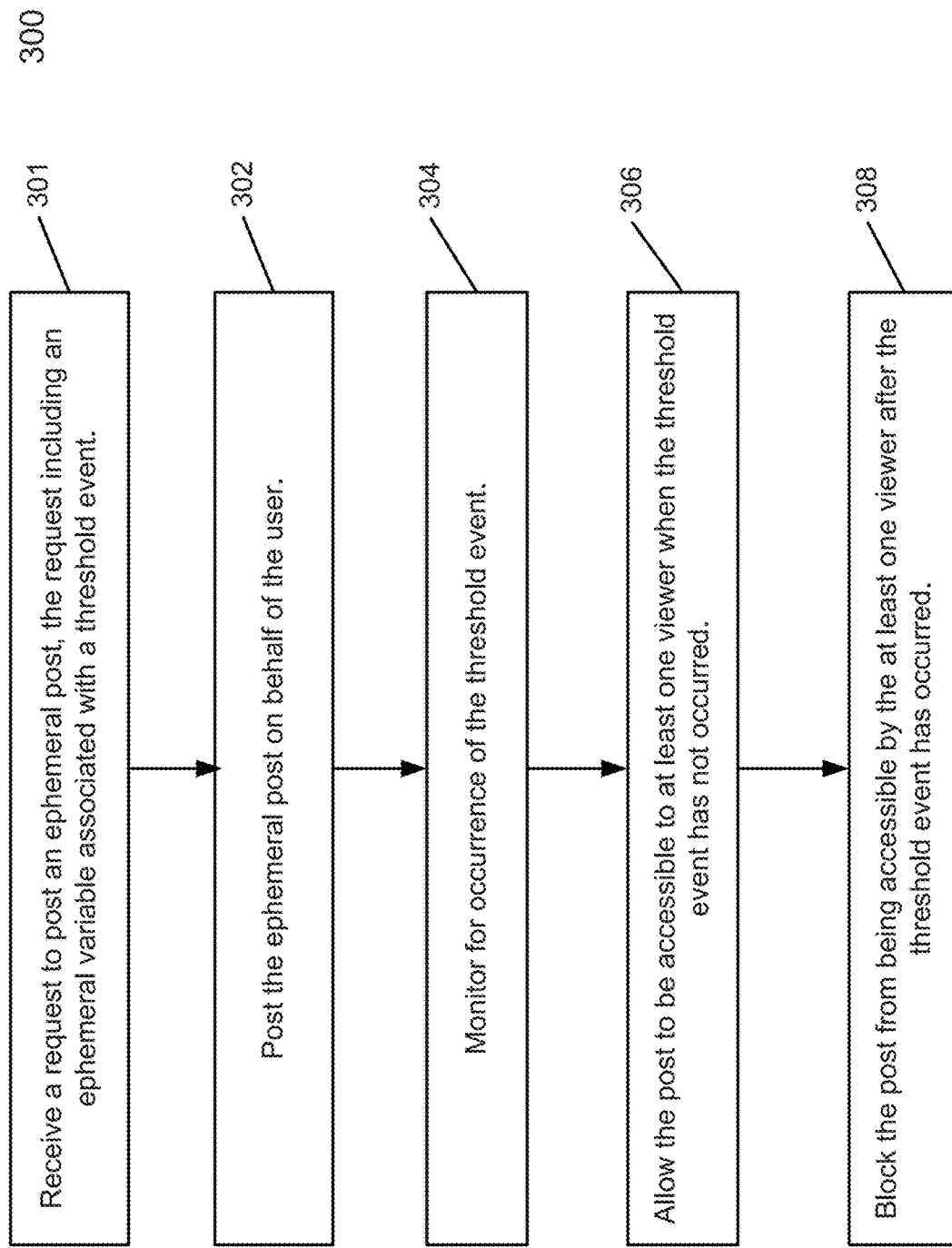
FIG. 3 is a flow diagram illustrating a method of managing ephemeral posts in a social networking system according to one embodiment of the invention.

FIG. 3 is a flow diagram illustrating a method of managing ephemeral posts in a social networking system according to one embodiment of the invention. Method 200 may be performed social networking system 106 in FIG. 1. A post posted to the social network system may contain at least one of a message, a photo, a videos, a tag, location information, sentiment, a text, a hyperlink to a location on the Internet, other structured data, or a combination of two or more types of content. The types of content of an ephemeral post may be as broad as a regular post in the social networking system.

Referring to FIG. 3, at block 301, the social networking system receives a request to post an ephemeral post. The request includes an ephemeral variable associated with a threshold event. The association may be triggered by the user indicating that a to-be-posted post is an ephemeral post in one embodiment. If the user does not specify an ephemeral variable, the social network system may attach a default ephemeral variable to the post. The ephemeral variable may be a time duration in an embodiment, indicating an intent to have the system to block the post from being viewed (i.e., expired) after the post is posted on the social networking site for the specified time duration. The ephemeral variable may be an interaction count in another embodiment, indicating an intent to have the post expire after the post is viewed, commented on, liked, etc. Alternatively, a user may indicate that a post is to expire if the post is not viewed, commented on, liked, etc. for the specified number of times.

The ephemeral variable may also be a combination of both time duration and interaction counts. Interaction counts can be based on a variety of interactions such as user clicks, views, shares, comments, promoting a post, forwarding, "likes", and etc. The threshold event is that a time duration and/or interaction counts reaches the defined setting or settings. As discussed herein, the number of selections of ephemeral variables and combinations/permutations of ephemeral variables containing a threshold event is nearly limitless. The principle is simple: by associating one or more ephemeral variables to a post, the user controls availability of his/her posted post on a social networking system.

In one embodiment, the system provides an indication to notify one or more viewer that the post-creating user has posted an ephemeral post in the social networking system. The notification may be an email or a text message (e.g., a text through short message service (SMS)) to an intended user (e.g., a viewer within the same online community of the post-creating user). In addition, the social networking system may associate an audio/visual symbol with the post-creating user on the social networking site to indicate the existence of such a post.

Referring back to FIG. 3, at block 302, the social network system posts the ephemeral post on behalf of the user. In one embodiment, the user dictates the audience of the post through selecting from a pre-defined list or a privacy setting (e.g., only self, only friends, acquaintances, friends of friends, particular list, particular group, public, etc.). In one embodiment, different audiences are given different ephemeral variables. Then the social networking system monitors for an occurrence of the specific threshold event at block 304. The system allows the post to be accessible (e.g., viewable) to at least one viewer other than the user when the monitored threshold event(s) has not occurred at reference 306. In a social networking system, it is not uncommon for a user to make a post viewable only to users in a selected community instead of every user in the system, and a user posting an ephemeral post may do the same and limit viewership of a selected community, as long as the monitored threshold event has not occurred.

At block 308, once a threshold event occurs, the system blocks the post from being accessible. A viewer that otherwise may see the post can no longer access the ephemeral post. The social networking system may still allow the post-creating user to see the post in one embodiment. In another embodiment, the system may remove the post so that even the post-creating user may not see the post again (the post being deleted from the system). The levels of blocking may be numerous: for example, an expired ephemeral post may be moved to a less visible place on the post-creating user's page on the system, it may be retrievable only through an operator of the system, or it may be searchable only for certain group of users. The levels of blocking are user configurable in one embodiment. In one embodiment, the system creates a specific timeline unit for expired ephemeral posts that are only viewed to the posting user.

In one embodiment, the blocking of an expired ephemeral post from being viewed (or otherwise accessed) may not be permanent and a viewer may ask the post-creating user to revive the expired ephemeral post under certain circumstances. In addition, an ephemeral post may become a regular post after certain event. For example, a post-creating user may specify an ephemeral post to be converted to a regular post if it receives a number of interaction data.

In one embodiment, the selected ephemeral variables are collected by the social networking system for analysis so that the system may provide better default ephemeral variables or ranges of ephemeral variables in the future. The selected ephemeral variables are collected, stored, or used in accordance with the local laws and user's privacy settings. For example, if the collected data shows that more users select the maximum interaction count allowed, the system may make the maximum interaction count number higher in the future. In addition, the collected data may include a time period between creating and displaying ephemeral posts, a time period between creating and blocking ephemeral posts, and other data for the social networking system to manage ephemeral posts better or provide a better user experience in using ephemeral posts.

In one embodiment, the social networking system provides a third party data about selected ephemeral variables of ephemeral posts for a certain group of users. A third party may be interested in sponsoring a modification of a counting ephemeral variable associated with certain ephemeral posts. For example, a studio may be willing to ask an ephemeral post-creating user to extend the duration of the ephemeral post if the post contains a favorable view of a TV show the studio is trying to promote. For a studio paid fee splitting between the user and an operator of the system, the user may accept a suggested revision of the ephemeral variable and associated threshold event (e.g., instead of the favorable ephemeral post expiring in 24 hours, the system may change the expiration to 7 days with user's consent).

The associating of an ephemeral post with an ephemeral variable does not necessarily happen solely for new ephemeral posts. In some embodiments, a user may modify an existing post to become an ephemeral one.

As discussed herein above, the associated ephemeral variable of an ephemeral post may be time duration of the post, interactivity count, or a combination. Interaction counts can be based on a variety of interactions such as user clicks, views, shares, comments, promoting a post, forwarding, "likes", and etc. The associated ephemeral variable may depend on the content of the post, location of the post-creating user, selected audience of the post, and other factors. In addition, the starting counting time for any type of ephemeral variables may be delayed by a selectable amount of time. For example, a user may want to start the ephemeral post at 1:00 am of the opening night of the latest installment of a movie, so that other movie goers see it.

In one embodiment, an ephemeral post includes one or more audio/visual indications, such that when a viewer sees the posted ephemeral post, he/she knows that it is ephemeral. The attached audio/visual indication may change as the ongoing post gets closer to the threshold event. For example, a traffic light may be attached to an ephemeral post that goes from green to red. For another example, an ephemeral post may have a colored boarder, or it may wiggle on the screen of the display. In a mobile setting, the existence of ephemeral post may be displayed on a mobile phone or tablet devices in one embodiment.

In one embodiment, the system provides default ephemeral variables to be associated with an ephemeral post. The default ephemeral variables may not be identical for all users and the system may provide a variety of default ephemeral variables depending on a number of factors. For example, the system may provide a default ephemeral variables based on post content—a commentary about global warming may be given a longer posting duration than an inquiry about going shopping. The system may also provide a default ephemeral variable based on demographic information it knows about the user—being more self-conscious, a teenager may prefer using interactivity count instead of post posting duration as the associated ephemeral variables. In addition, the default ephemeral variable can be based on audience of a post, e.g., a close friend with a high coefficient or affinity can have a longer time than other users. The default ephemeral variables may also be based on the user's physical location. For example, an ephemeral post posted from a bar may be given shorter default posting duration than an ephemeral post posted from a university library.

In one embodiment, the system provides a range of ephemeral variables depending on a number of factors. For example, based on content of posts, some contents are given a wider range of time or activity count than others.

Note the variety of embodiments discussed herein above is not meant to be an exhaustive list of possible embodiments, and they are only illustrations of the underlying principle.

Figure 4:
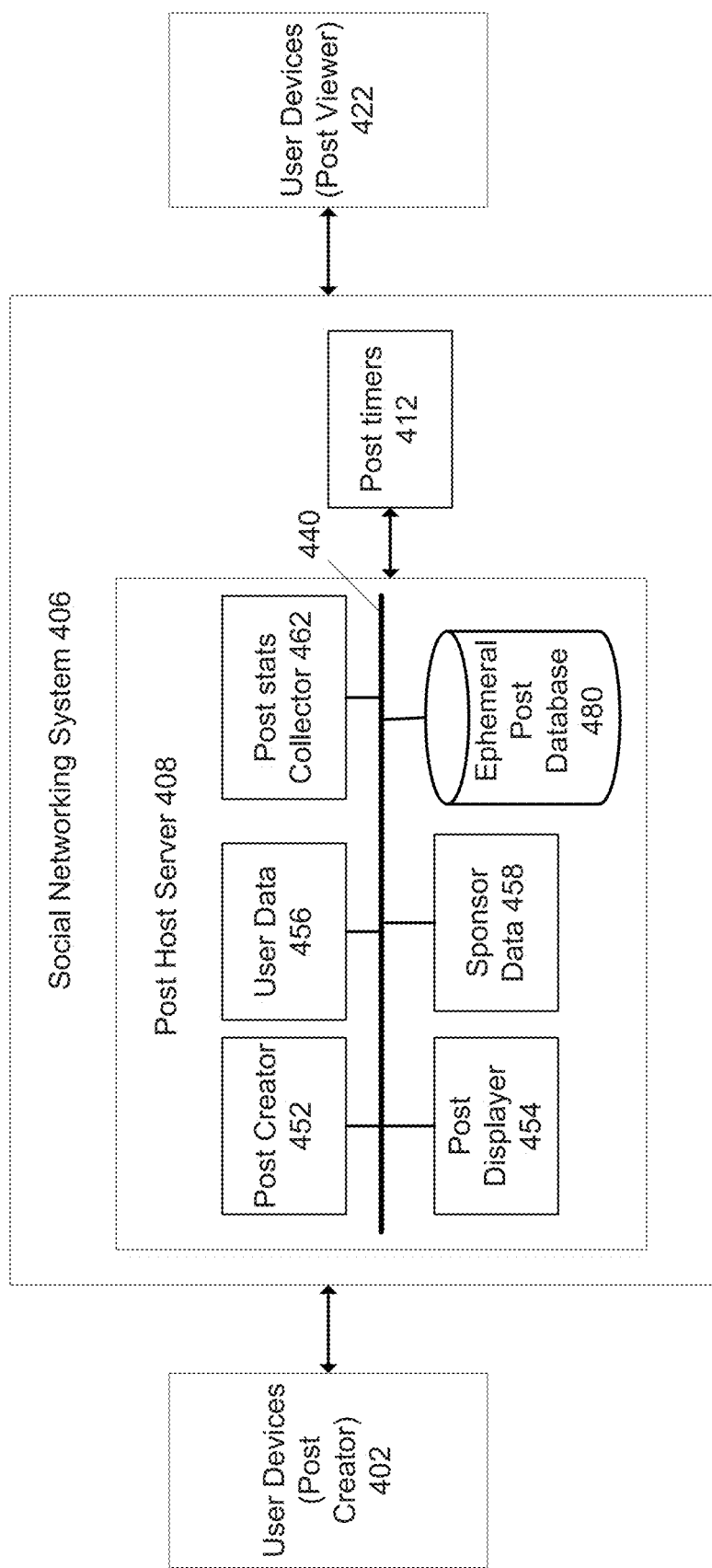
FIG. 4 is a block diagram illustrating a social networking system managing ephemeral posts according to one embodiment of the invention.

FIG. 4 is a block diagram illustrating a social networking system managing ephemeral posts according to one embodiment of the invention. Social networking system 406 is similar to social networking system 106 of FIG. 1 and the same or similar references indicate elements or components having the same or similar functionalities. In addition to social networking system 406, user devices 402 is used by a user to create ephemeral posts while user devices 422 is used by another user to review the created ephemeral posts. Both user devices 402 and 422 are communicatively coupled to social networking system 406.

Social networking system 406 contains post host server 408 and post timers 412. In one embodiment, post timers 412 is implemented within post host server 408 instead of being communicatively coupled to post host server 408 as shown in FIG. 4.

Post timers 412 may contain a variety of ephemeral variable selections supported by social networking system 406 as detailed above. Post timers 412 perform ephemeral variable measuring and monitor expiration of the ephemeral variables associated with ephemeral posts. Post timers 412 notify post host server 408 to display or block an ephemeral post depending on the status of its associated ephemeral variable.

In one embodiment, post host server 408 contains post creator module 452, post displayer module 454, user data module 456, sponsor data module 458, post statistics collector module 462, and ephemeral post database 480. Note some modules within post host server 408 may be integrated together, and some modules may not be implemented within post host server 408 and are implemented as standalone entities that communicatively coupled to post host server 408. Also, when social networking system 406 supports only a subset of features of ephemeral posting, some modules illustrated in FIG. 4 may not be implemented.

Post creator 452 coordinates posting an ephemeral post to the social networking system 406. Post creator 452 interacts with a post-creating user or a post modifying user and receives user selections of an ephemeral post. The received user selections are then fed to post host server 408 to create an ephemeral post. Post creator 452 may collect data related to the ephemeral post and store them to post statistics collector 462 for analysis and fine tuning the performance of social networking system 306. The data related to ephemeral post are collected, stored, or used in accordance with the local laws and user's privacy settings. Post creator 452 may apply default selections for an ephemeral post when a post-creating user has not made a proper selection, or when the social networking system 406 considers overwriting a user selection necessary. Note post creator 452 may be able to create regular posts as well as ephemeral posts.

Post displayer 454 coordinates display and otherwise makes accessible of an ephemeral post on the social networking system 406. The displaying may include showing the ephemeral post on a social networking site on the Internet or on an application of a user device through "pushing" the data to the user device. Post displayer 454 may block an ephemeral post from being viewed by one group of users but allow access to another group. For example, it may allow the post-creating user to see an expired ephemeral post while other users are blocked. Post displayer 454 coordinates with post timers 412 to determine how long to display an ephemeral post and to which user(s) to display to.

User data 456 stores user related data including user demographics, user locations, user activities, and other user profiling data on the social networking site. The data is useful for social networking system 406 to set default ephemeral variables associating with an ephemeral post when a user fails to create an ephemeral variable. The data may also be useful for data analysis of user behavior in using an ephemeral post. By correlating user-profiling data with a user's selection of ephemeral posts (duration, type of ephemeral variables, and etc.), the social networking system learns preferences of ephemeral variables of ephemeral posts of the user and his/her type of users, and that knowledge may be used to further improve the user experience in using ephemeral posts. In addition, the knowledge may be monetized by the social networking system in targeted advertisement. For example, if an ephemeral post asks about the best bargain in a shopping mall and the ephemeral post is set to expire by the end of upcoming weekend, a vendor in the shopping mall may generate a promotion that is good for the upcoming Saturday morning only to be attached to the post or displayed along with the post on the message posting page displaying the post.

Sponsor data 458 stores data related to third party sponsors of ephemeral posts. A third party sponsor may have certain criteria for targeted advertisement relating to ephemeral posting, and the criteria may be stored in sponsor data 458. In addition, a third party sponsor may prefer to prolong or shorten an ephemeral variable associated with ephemeral posts, and sponsor data 458 may store the third party sponsor's criteria of modifying ephemeral variable associated with ephemeral posts. Social networking system 406 may take ephemeral variable-modifying criteria stored in sponsor data 458 and revise the ephemeral variable associated with existing ephemeral posts or suggest ephemeral variables associating with to-be-created posts. A third party sponsor may pay a fee for the service.

Post statistics collector 462 collects statistics associated with ephemeral posts. For example, the collected statistics may include selected ephemeral variables associated with various content and user with various profiles, the time period between creating and displaying ephemeral posts, and a time period between creating and blocking ephemeral posts. In one embodiment, the system provides a view solely for a post-creating user of the social networking system through retrieving data from post statistics collector 462. The user then may view his/her past ephemeral posts and interactivity/time duration statistics. These and other collected statistics may help social networking system 406 to fine-tune its operations in supporting ephemeral posts. The collected statistics may also be provided to a third party that is interested in user behaviors.

Ephemeral post database 480 stores ephemeral posts posted in social networking system 406. Various ephemeral variables associated with ephemeral posts may be stored with these posts as well. In one embodiment, ephemeral post database is only a subset of a database storing all posts posted in social networking system 406. In another embodiment, ephemeral post database 480 is a standalone entity outside of post host server 408.

Figure 5:
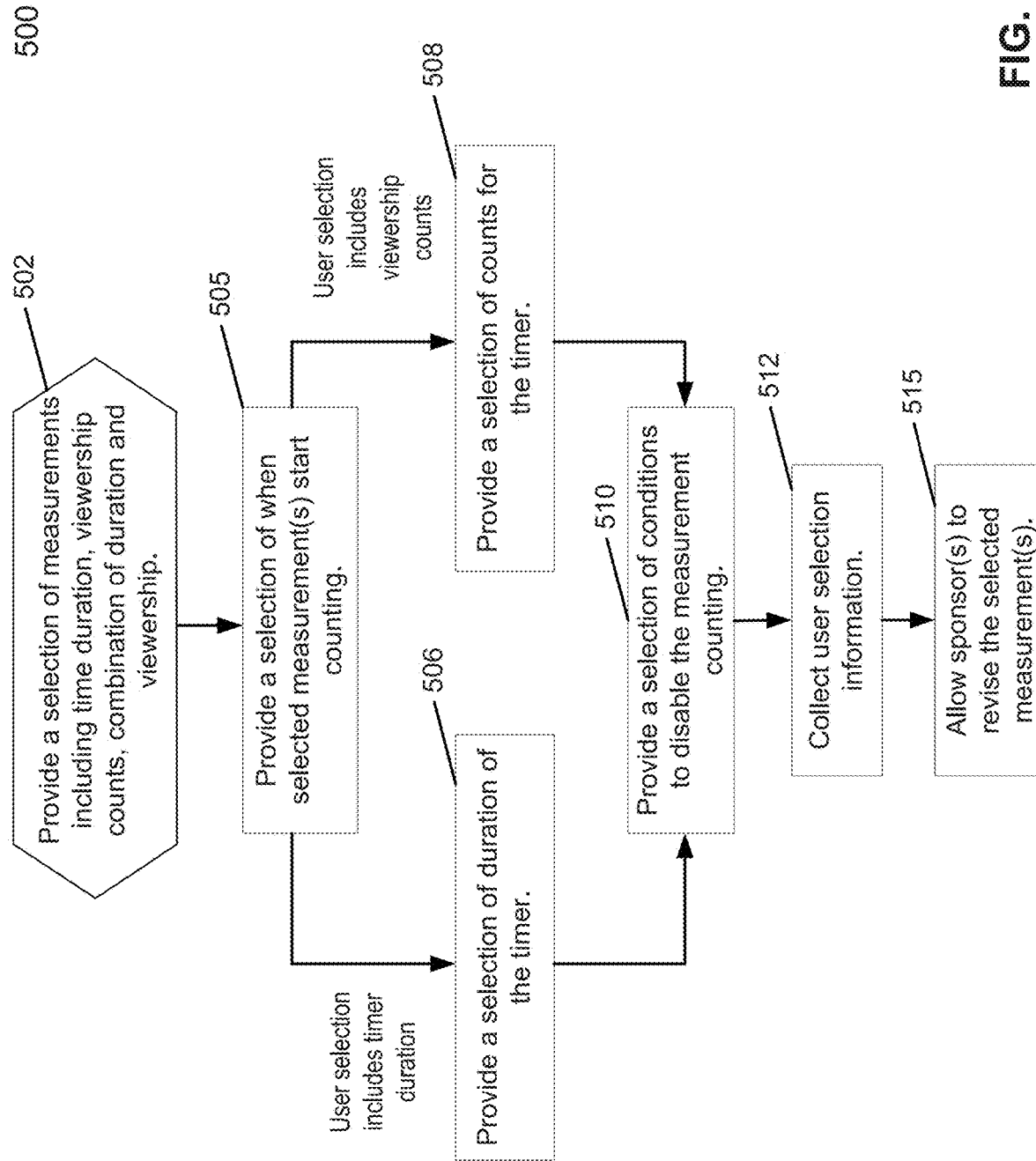
FIG. 5 is a flow diagram illustrating a social networking system managing ephemeral posts according to one embodiment of the invention.

FIG. 5 is a flow diagram illustrating a social networking system managing ephemeral posts according to one embodiment of the invention. At reference 502, the social networking system provides a selection of ephemeral variables to a post-creating user when the user creates a post. The ephemeral variables may include time duration, viewership counts, or a combination thereof. At reference 504, the social networking system provides a selection of when the selected ephemeral variable or ephemeral variables start as the system may allow a user to set a starting time after the post is posted. When a user selection includes a timer duration, the method 500 goes to reference 506, where the system provides a selection of duration of the timer. If the user selection includes an interactivity counts, method 500 goes to reference 508, where the system provides a selection of interactivity counts. Note that a user may select multiple ephemeral variables combining both time duration and interactivity counts.

At reference 510, the system provides a selection of conditions to disable the ephemeral variable counting, that is, the selection of conditions that the user may specify to disassociate the selected ephemeral variables with the ephemeral post. As discussed herein above, in one embodiment, the system allows a user to specify under what condition to re-categorize an ephemeral post to a regular post. References 502-510 may be performed by post creator 452 in coordination with post timers 412 and other modules in FIG. 4. Note the user may specify no condition to disassociate the selected ephemeral variables with the ephemeral post. In that case, the system provides a default post timer or inactivity count based on inference on post content, post audience, location of the user at the time of posting (e.g., a post from created from the user's classroom may have a shorter timer than a post from the same user's expedition at Mount Everest), and other factors. In addition, the system may prompt a question to make an ephemeral post permanent when default post timer or inactivity count is about to expire.

At reference 512, the system may collect user selection information as the user selects ephemeral variables associating with the post. The system may continue to collect data about the ephemeral post after its creation and until the post expires or converts to a regular post. For example, the collected data includes the time period between the time the ephemeral post is posted and the time the ephemeral post is disassociated with any ephemeral variable (thus no longer ephemeral), in addition to the ephemeral variables the user initially selected. Reference 512 may be performed by post statistics collector 462 in coordination with post timers 412 and other modules in FIG. 4.

At reference 515 of FIG. 5, the system may allow a third party sponsor to revise one or more of the selected ephemeral variables by the post-creating user. A third party sponsor may revise ephemeral variables to promote its commercial interests. Reference 515 may be performed by sponsor data 456 in coordination with other modules in FIG. 4.

Note the order of method 500 may differ in different embodiments. For example, collecting user selection information may occur after allowing a sponsor to revise a selected ephemeral variable. Also, user may make no decision with respect to ephemeral variables, and the system may attach one or more default ephemeral variables to an ephemeral post base on a variety of factors as discussed herein above.

Figure 6:
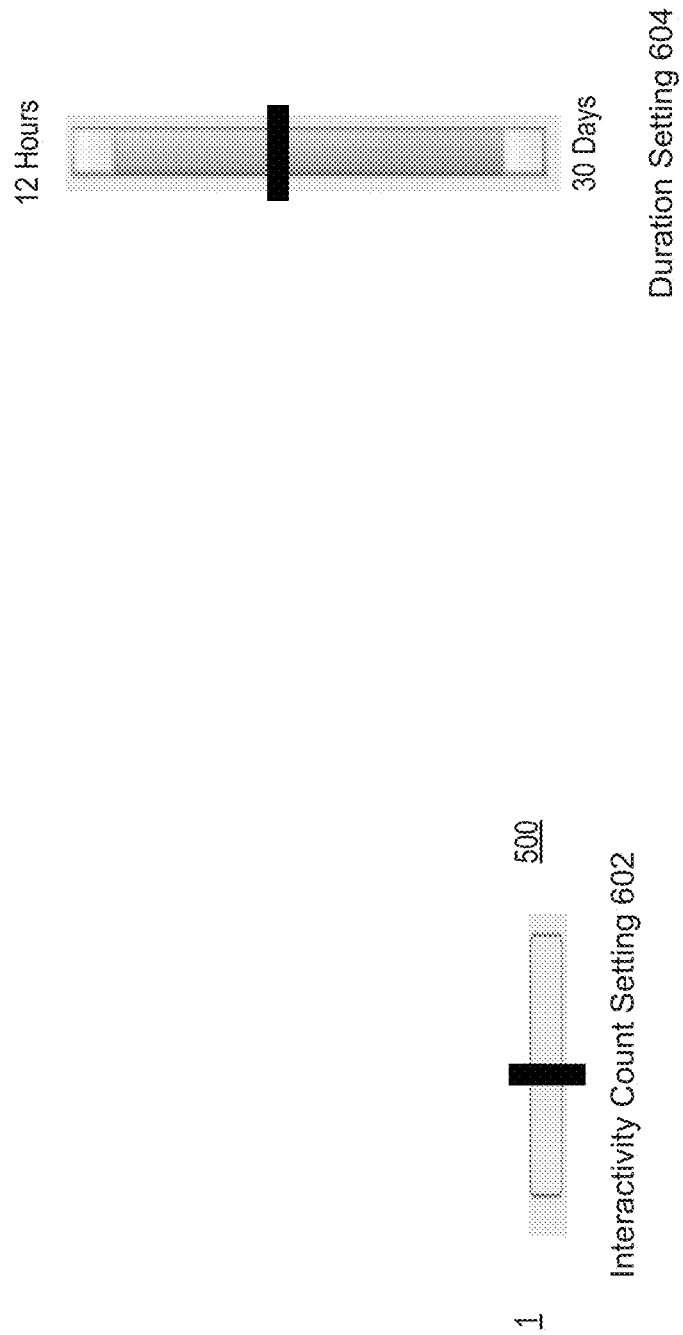
FIG. 6 is a block diagram illustrating an ephemeral variable selection graphic user interface (GUI) of a social networking system according to one embodiment of the invention.

A number of graphic user interfaces may be deployed by a social networking system to create or modify an ephemeral post. FIG. 6 is a block diagram illustrating an ephemeral variable selection graphic user interface (GUI) of a social networking system according to one embodiment of the invention. The GUI may be a pop-up box for a user to create an ephemeral post. The GUI includes a duration setting at reference 604. The setting has a range and a user may select a value within the range so that a created ephemeral post will be associated with the selected value (i.e., a threshold being reached once a timer starts counting). The GUI may also include an interactivity count setting at reference 602. The interactivity count setting has a selectable range.

Figure 7:
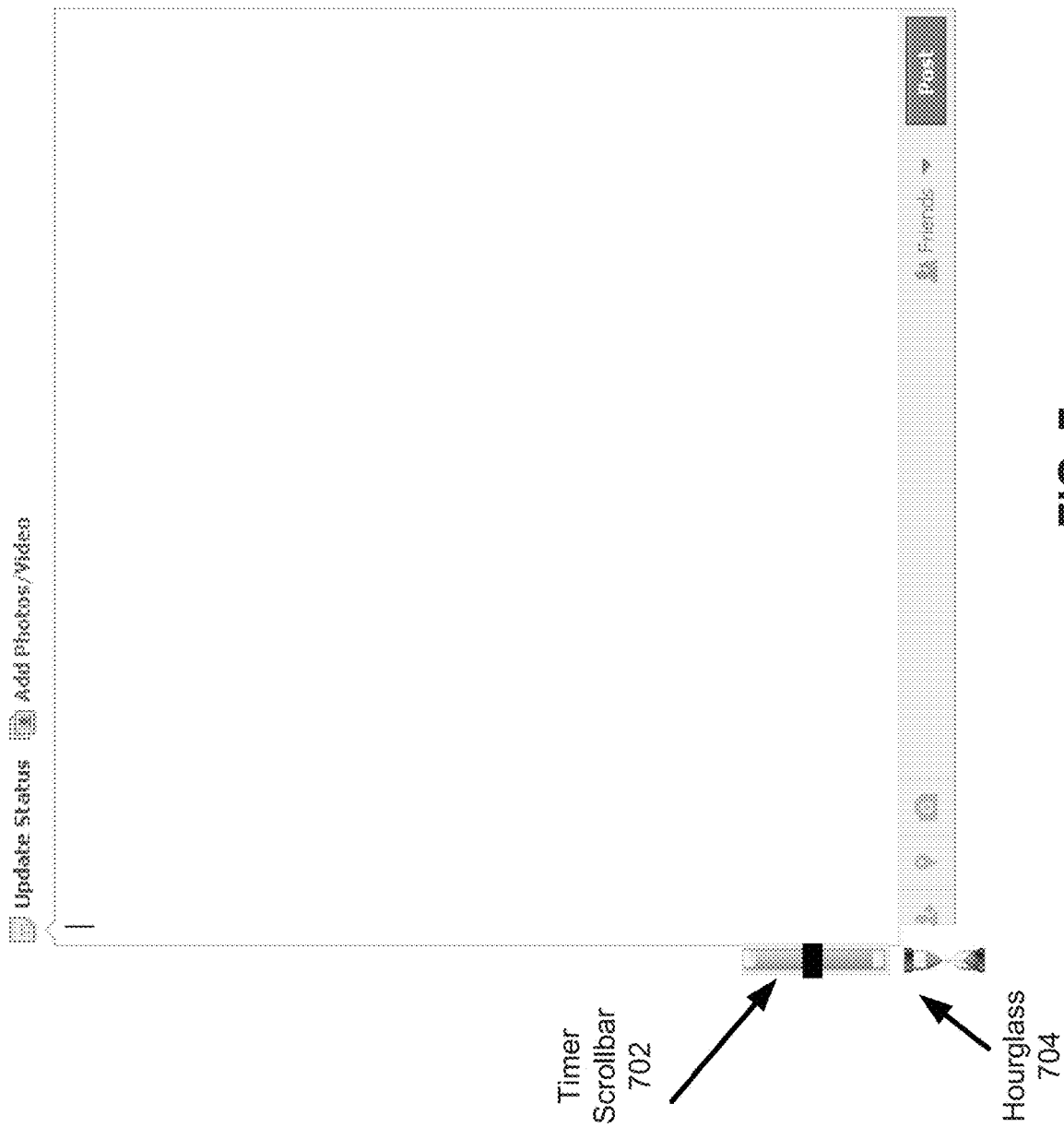
FIG. 7 is a block diagram illustrating a graphic user interface (GUI) used for creating an ephemeral post at a social networking system according to one embodiment of the invention.

FIG. 7 is a block diagram illustrating a graphic user interface (GUI) used for creating an ephemeral post at a social networking system according to one embodiment of the invention. The post creating GUI has a layout similar to that of regular post. For example, it includes "Update Status" and "Add Photos/Videos" options at the top of the GUI. However, at the side of the type pad, a timer scrollbar at reference 702 is provided. The timer scrollbar has a post duration range and a post-creating user may select a value within the range by sliding the bar within the scrollbar. The hourglass at reference 704 indicates a duration of an ephemeral post.

Figure 8A:
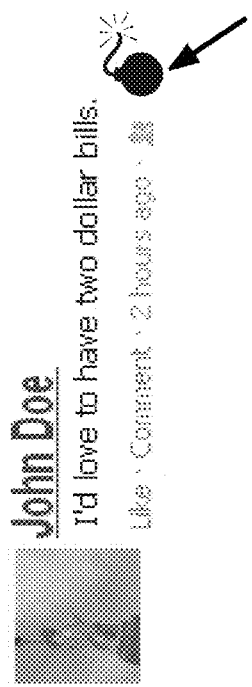
FIGS. 8A-B are block diagrams illustrating graphic user interfaces (GUIs) used for ephemeral post at a social networking system according to embodiments of the invention.
Figure 8B:
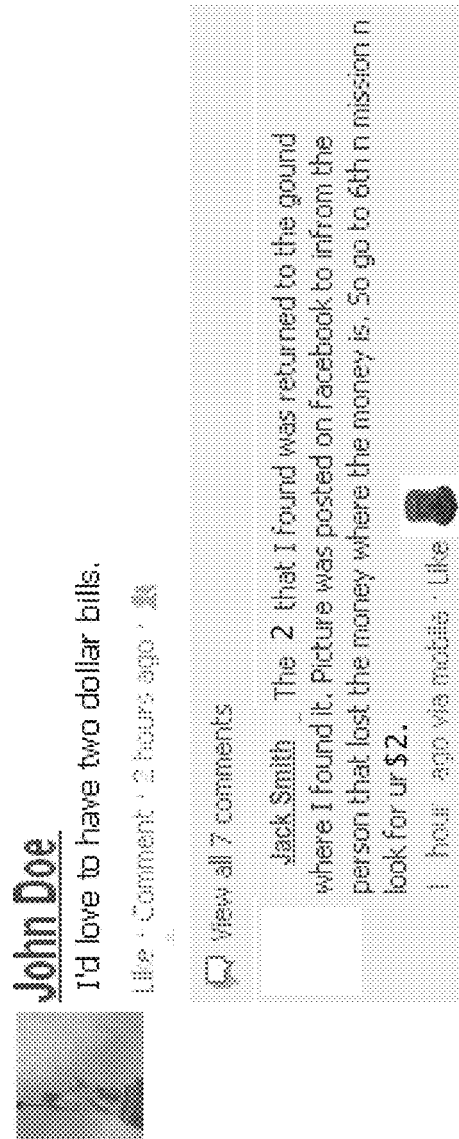

FIGS. 8A-B are block diagrams illustrating graphic user interfaces (GUIs) used for ephemeral post at a social networking system according to embodiments of the invention. FIG. 8A is a GUI for viewing a posted ephemeral post. The layout is similar to a regular posted post except for the inclusion of a visual timer indication symbol at reference 802. The symbol at reference 802 reminds a viewer that the post is ephemeral and it may not be viewable after a certain event. Note that in one embodiment, the system may not let viewers know that a post is ephemeral thus the GUI for an ephemeral post is indistinguishable from the GUI for a regular post in this embodiment.

FIG. 8B is a GUI for viewing an ephemeral reply to a posted post. The layout for the reply is similar to a regular reply to a posted post except for an audio/visual timer indication at reference 804.

Figure 9:
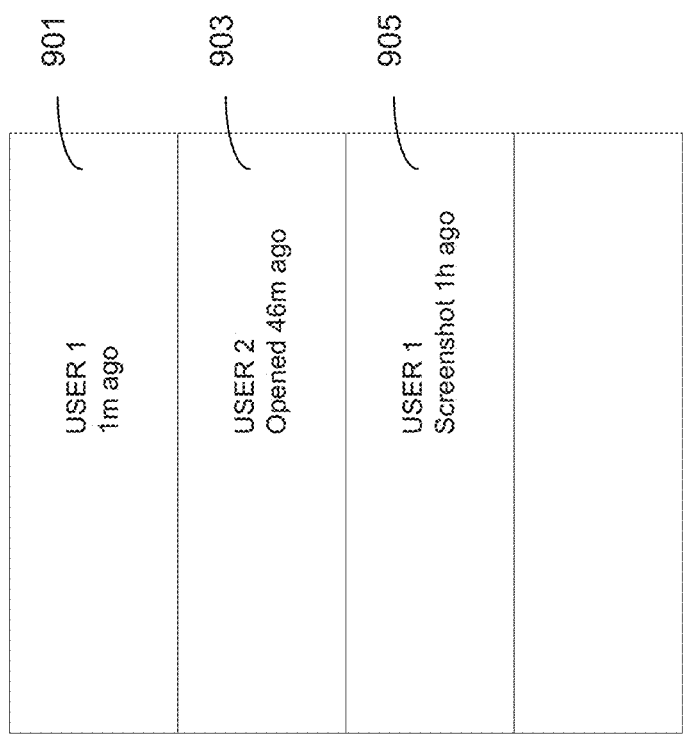
FIG. 9 illustrates an embodiment of a user interface for an ephemeral posting application.

FIG. 9 illustrates an embodiment of a user interface for an ephemeral posting application. In this particular example, this is a user interface for a standalone application to be run on a device such as a smartphone or tablet. This user interface displays both received and sent ephemeral posts for a user of the social network. Through this user interface a user may send and receive posts in the form of text, pictures, pokes, and/or video. In some embodiments, only users of the social network may use this application and each user's username is associated with their respective posts.

Typically, to view a post in this application, the user presses the screen where the post is until the content of the post appears on the screen. A countdown will also appear on the screen to indicate to the user how long he/she has to view the post. In some embodiments, the countdown will halt when the user releases the screen.

The user interface indicates how long ago a post was sent or received as shown in 901. The user interface also displays how long ago a post was opened as shown in 903. The user interface may also indicate when a receiving user has taken a screenshot of the ephemeral post as shown in 905.

In some embodiments, the application allows a user to have a post disappear from the after a user set period of time regardless of if the post was viewed by the recipient.

Figure 10:
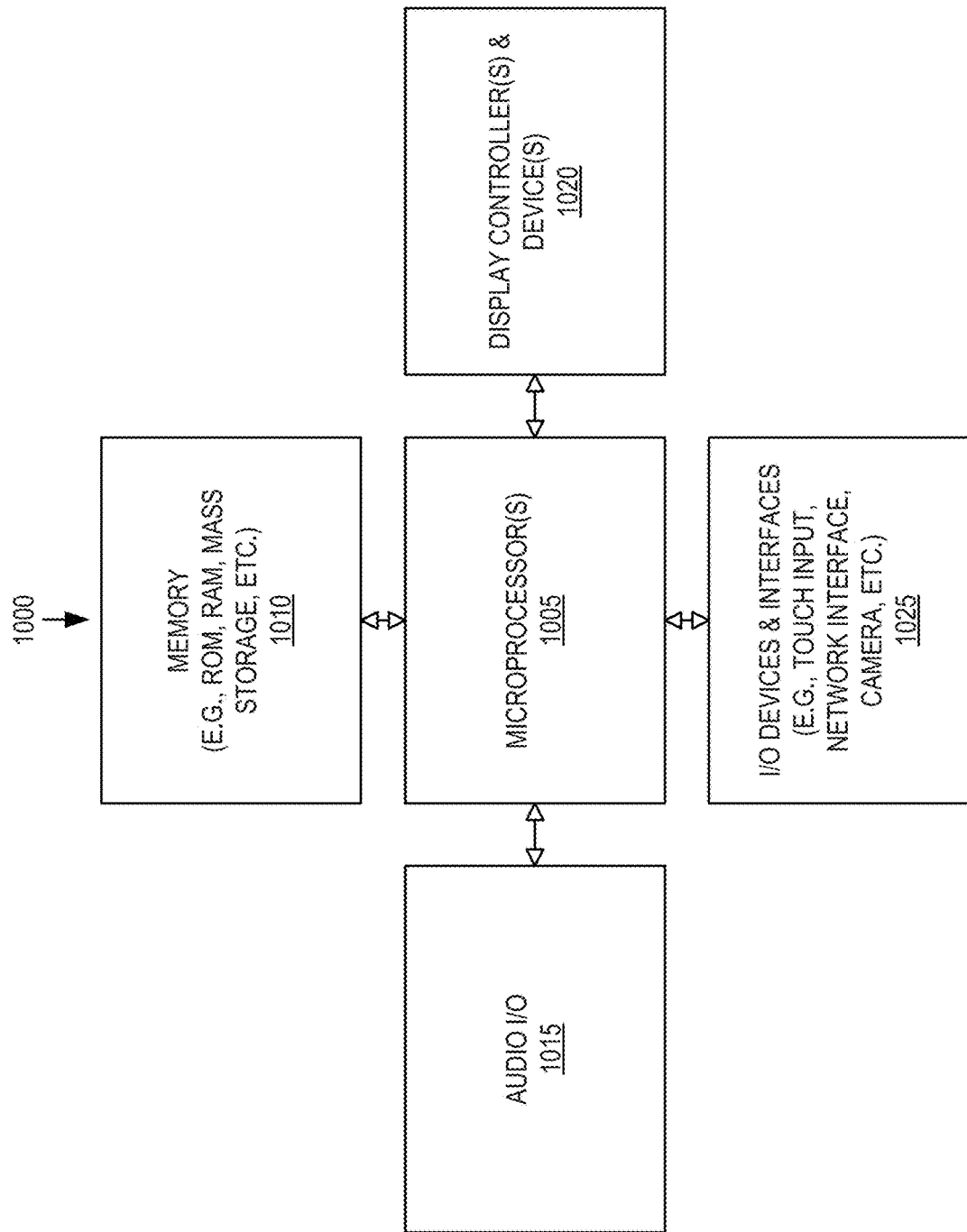
FIG. 10 illustrates a computing system in which embodiments may operate, be installed, integrated, or configured.

FIG. 10 illustrates, in block diagram form, an exemplary computing system 1000 in accordance with which embodiments may operate, be installed, integrated, or configured. The computing system 1000 includes one or more microprocessors 1005 and connected system components (e.g., multiple connected chips). Alternatively, the computing system 1000 is a system on a chip.

The computing system 1000 includes memory 1010, which is coupled to the microprocessor(s) 1005. The memory 1010 may be used for storing data, metadata, and programs for execution by the microprocessor(s) 1005. The memory 1010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1010 may be internal or distributed memory.

The computing system 1000 also includes an audio input/output subsystem 1015 which may include a microphone and/or a speaker for, for example, playing back music or other audio, receiving voice instructions to be executed by the microprocessor(s) 1005, playing audio notifications, etc.

A display controller and display device 1020 provides a visual user interface for the user. In an embodiment where the computing system 1000 is an exemplary representation of the user device 102 of FIG. 1, the display device 1020 may display the GUI windows illustrated in FIGS. 6, 7, and 8A-B.

The computing system 1000 also includes one or more input or output ("I/O") devices and interfaces 1025, which are provided to allow a user to provide input to, receive output from, and otherwise transfer data to and from the system. These I/O devices 1025 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the computing system 1000.

The I/O devices and interfaces 1025 may also include a connector for a dock or a connector for a USB interface, FireWire, Thunderbolt, Ethernet, etc. to connect the computing system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 1000 with another device, external component, or a network and receive stored instructions, data, tokens, etc.

It will be appreciated that one or more buses, may be used to interconnect the various components shown in FIG. 10.

In one embodiment, the computing system 1000 is an exemplary representation of the user device 102 of FIG. 1. The computing system 1000 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In another embodiment, the computing system 1000 is an exemplary representation of a server computer in the social networking system 106 of FIG. 1. In other embodiments, the computing system 1000 may be a network computer, server, or an embedded processing device within another device or consumer electronic product. As used herein, the terms computer, system, device, processing device, and "apparatus comprising a processing device" may be used interchangeably with the computing system 1000 and include the above-listed exemplary embodiments.

It will be appreciated that additional components, not shown, may also be part of the computing system 1000, and, in certain embodiments, fewer components than that shown in FIG. 10 may also be used in a computing system 1000. It will be apparent from this description that aspects of the inventions may be embodied, at least in part, in software. That is, computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network interface device 1025. In various embodiments, hardwired circuitry may be used in combination with the software instructions to implement the present embodiments. Thus, the techniques are not limited to any specific combination of hardware circuitry and software, or to any particular source for the instructions executed by the computing system 1000.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
  receiving an ephemeral post published to a social network at a posting time, the ephemeral post having an associated time limit from the posting time within which the ephemeral post can be viewed;
  providing an indication of the ephemeral post within a graphical user interface;
  receiving a selection of the indication of the ephemeral post;
  providing the ephemeral post in the graphical user interface in response to the selection of the indication of the ephemeral post;
  providing a dynamic notification with the ephemeral post that includes an amount of time since the posting time of the ephemeral post;
  determining that the associated time limit from the posting time has been reached;
  blocking access to the ephemeral post in response to the associated time limit from the posting time having been reached; and
  allowing a poster of the ephemeral post access to the ephemeral post after blocking access to the ephemeral post.

2. The computer-implemented method of claim 1, wherein blocking access to the ephemeral post in response to the associated time limit from the posting time having been reached comprises blocking, for a first subset of client devices associated with a first subset of users of a plurality of users, access to the ephemeral post upon a first associated time limit expiring.

3. The computer-implemented method of claim 2, further comprising blocking, for a second subset of client devices associated with a second subset of users of the plurality of users, access to the ephemeral post upon a second associated time limit expiring.

4. The computer-implemented method of claim 1, further comprising displaying, within the ephemeral post, a visual symbol to distinguish the ephemeral post from non-ephemeral posts.

5. The computer-implemented method of claim 1, further comprising:
    detecting, irrespective of the associated time limit, an occurrence of a conversion event; and
    converting the ephemeral post to a non-ephemeral post in response to the occurrence of the conversion event, wherein a selected audience has access to the non-ephemeral post after an expiration of the associated time limit.

6. The computer-implemented method of claim 5, wherein the conversion event comprises a request to revive the ephemeral post or a set number of user interactions with the ephemeral post prior to conversion of the ephemeral post to a non-ephemeral post.

7. The computer-implemented method of claim 1, further comprising updating the dynamic notification as time passes since the posting time of the ephemeral post.

8. A non-transitory computer-readable medium storing instructions that, when executed by at least one processor, cause the least one processor to perform operations comprising:
    receiving an ephemeral post published to a social network at a posting time, the ephemeral post having an associated time limit from the posting time within which the ephemeral post can be viewed;
    providing an indication of the ephemeral post within a graphical user interface;
    receiving a selection of the indication of the ephemeral post;
    providing the ephemeral post in the graphical user interface in response to the selection of the indication of the ephemeral post;
    providing a dynamic notification with the ephemeral post that includes an amount of time since the posting time of the ephemeral post;
    determining that the associated time limit from the posting time has been reached;
    blocking access to the ephemeral post in response to the associated time limit from the posting time having been reached; and
    allowing a poster of the ephemeral post access to the ephemeral post after blocking access to the ephemeral post.

9. The non-transitory computer-readable medium of claim 8, wherein blocking access to the ephemeral post in response to the associated time limit from the posting time having been reached comprises blocking, for a first subset of client devices associated with a first subset of users of a plurality of users, access to the ephemeral post upon a first associated time limit expiring.

10. The non-transitory computer-readable medium of claim 9, wherein the operations further comprise blocking, for a second subset of client devices associated with a second subset of users of the plurality of users, access to the ephemeral post upon a second associated time limit expiring.

11. The non-transitory computer-readable medium of claim 8, further comprising displaying, within the ephemeral post, a visual symbol to distinguish the ephemeral post from non-ephemeral posts.

12. The non-transitory computer-readable medium of claim 8, further comprising:
    detecting, irrespective of the associated time limit, an occurrence of a conversion event; and
    converting the ephemeral post to a non-ephemeral post in response to the occurrence of the conversion event, wherein a selected audience has access to the non-ephemeral post after an expiration of the associated time limit.

13. The non-transitory computer-readable medium of claim 12, wherein the conversion event comprises a request to revive the ephemeral post or a set number of user interactions with the ephemeral post prior to conversion of the ephemeral post to a non-ephemeral post.

14. The non-transitory computer-readable medium of claim 8, further comprising updating the dynamic notification as time passes since the posting time of the ephemeral post.

15. A system comprising:
    one or more memory devices;
    at least one processor configured to cause the system to:
        receive an ephemeral post published to a social network at a posting time, the ephemeral post having an associated time limit from the posting time within which the ephemeral post can be viewed;
        provide an indication of the ephemeral post within a graphical user interface;
        receive a selection of the indication of the ephemeral post;
        provide the ephemeral post in the graphical user interface in response to the selection of the indication of the ephemeral post;
        provide a dynamic notification with the ephemeral post that includes an amount of time since the posting time of the ephemeral post;
        determine that the associated time limit from the posting time has been reached;
    block access to the ephemeral post in response to the associated time limit from the posting time having been reached; and
    allow a poster of the ephemeral post access to the ephemeral post after blocking access to the ephemeral post.

16. The system of claim 15, wherein the at least one processor is configured to further cause the system to:
    detect an occurrence of a conversion event; and
    convert the ephemeral post to a non-ephemeral post in response to the occurrence of the conversion event, wherein a selected audience has access to the non-ephemeral post after an expiration of the associated time limit.

17. The system of claim 16, wherein the conversion event comprises a request to revive the ephemeral post or a set number of user interactions with the ephemeral post prior to conversion of the ephemeral post to a non-ephemeral post.

18. The system of claim 16, wherein the at least one processor is configured to further cause the system to allow the poster of the ephemeral post access to the ephemeral post before the ephemeral post is converted to the non-ephemeral post.

19. The system of claim 16, wherein the at least one processor is configured to further cause the system to detect an interaction count with the ephemeral post based on comments, reactions, shares, or forwards with respect to the ephemeral post.

20. The system of claim 15, wherein the at least one processor is configured to further cause the system to update the dynamic notification as time passes since the posting time of the ephemeral post.

\* \* \* \* \*